United States Patent
Nodera et al.

(10) Patent No.: US 6,838,502 B1
(45) Date of Patent: Jan. 4, 2005

(54) POLYCARBONATE RESIN COMPOSITION

(75) Inventors: Akio Nodera, Ichihara (JP); Masahiro Kitayama, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 235 days.

(21) Appl. No.: 09/926,640

(22) PCT Filed: Jun. 23, 2000

(86) PCT No.: PCT/JP00/04144

§ 371 (c)(1),
(2), (4) Date: Nov. 28, 2001

(87) PCT Pub. No.: WO01/07520

PCT Pub. Date: Feb. 1, 2001

(30) Foreign Application Priority Data

Jul. 28, 1999 (JP) ............................................. 11-213644

(51) Int. Cl.$^7$ ............................ C08K 5/09; C08L 27/12; C08L 27/18; C08L 51/00
(52) U.S. Cl. ....................... 524/395; 524/400; 524/463; 524/504; 523/201; 523/206; 523/212
(58) Field of Search ................................. 524/261, 395, 524/400, 463, 504; 525/67, 146; 523/206

(56) References Cited

U.S. PATENT DOCUMENTS

| | | |
|---|---|---|
| 3,971,756 A | 7/1976 | Bialous et al. |
| 4,710,534 A * | 12/1987 | Liu .............................. 524/411 |
| 5,837,757 A | 11/1998 | Nodera et al. |
| 6,127,465 A | 10/2000 | Nodera |
| 6,150,443 A | 11/2000 | Nodera et al. |
| 6,174,944 B1 | 1/2001 | Chiba et al. |
| 6,197,857 B1 | 3/2001 | Nodera et al. |
| 6,331,584 B1 | 12/2001 | Nodera et al. |
| 6,348,527 B1 | 2/2002 | Nodera |
| 6,369,142 B1 | 4/2002 | Nodera et al. |

FOREIGN PATENT DOCUMENTS

| | | |
|---|---|---|
| EP | 0 289 828 | 11/1988 |
| EP | 902 060 | 3/1999 |
| JP | 10-306308 | 11/1998 |
| WO | WO 94/11429 * | 5/1994 |

OTHER PUBLICATIONS

Patent Abstracts of Japan, JP 10–306208, Nov. 17, 1998.

* cited by examiner

Primary Examiner—Tae H. Yoon
(74) Attorney, Agent, or Firm—Oblon, Spivak, McClelland, Maier & Neustadt, P.C.

(57) ABSTRACT

Provided is a flame-retardant polycarbonate resin composition comprising (A) 100 parts by weight of a polycarbonate resin, (B) from 0.2 to 10 parts by weight of a core/shell type, grafted rubbery elastomer, (C) from 0.02 to 5 parts by weight of an organic alkali metal salt and/or an organic alkaline earth metal salt, and (D) from 0.02 to 3 parts by weight of a polyfluoro-olefin resin. Not containing a halogen compound for flame retardation, it has good flame retardancy, and its moldability, impact resistance, thermal stability, wet heat resistance and recyclability are all good.

20 Claims, No Drawings

POLYCARBONATE RESIN COMPOSITION

REFERENCE TO PRIOR APPLICATIONS

This application is a National Stage Application under 35 U.S.C. §371 of PCT application, PCT/JP00/04144, filed Jun. 23, 2000, which claims priority to Japanese Application No. 11-213644, filed Jul. 28, 1999.

TECHNICAL FIELD

The present invention relates to a flame-retardant polycarbonate resin composition. More precisely, it relates to a flame-retardant polycarbonate resin composition not containing halogen but containing a minor additive to exhibit good flame retardancy and have good moldability, good impact resistance, good thermal stability, good wet heat resistance and good recyclability.

BACKGROUND ART

As having the advantages of impact resistance, heat resistance and good electric properties, polycarbonate resins have many applications in various fields of, for example, OA (office automation) appliances, information and communication appliances, other electric and electronic appliances for industrial use and household use, automobile parts and building materials. As a rule, polycarbonate resins are self-extinguishable. However, some fields of typically OA appliances, information and communication appliances, and other electric and electronic appliances for industrial use and household use require high flame retardancy, for which are used various flame retardants to improve their flame retardancy.

For improving the flame retardancy of polycarbonate resins, halogen-containing flame retardants such as bisphenol A halides and halogenated polycarbonate oligomers have been used along with a flame retardation promoter such as antimony oxide, as their flame-retarding ability is good. However, with the recent tendency toward safety living and environmental protection from discarded and incinerated wastes, the market requires flame retardation with non-halogen flame retardants. As non-halogen flame retardants, phosphorus-containing organic flame retardants, especially organic phosphate compounds may be added to polycarbonate resin compositions, for which various methods have been proposed. Such flame retardants, organic phosphate compounds serve also as a plasticizer, and polycarbonate resin compositions containing them exhibit excellent flame retardancy.

In order to make polycarbonate resins have good flame retardancy by adding thereto a phosphate compound, a relatively large amount of the compound must be added to the resins. In general, polycarbonate resins require relatively high molding temperatures, and their melt viscosity is high. Therefore, for molding them into thin-walled and large-sized moldings, the molding temperature will have to be more and more higher. For these reasons, phosphate compounds often cause some problems when added to such polycarbonate resins, though their flame-retarding ability is good. For example, phosphate compounds often corrode molds used for molding resins containing them, and generate gas to have some unfavorable influences on the working environments and even on the appearance of the moldings. Another problem with phosphate compounds is that, when the moldings containing them are left under heat or in high-temperature and high-humidity conditions, the compounds lower the impact strength of the moldings and yellow the moldings. On the other hand, the recent tendency in the art is toward recycling resin products for saving natural resources. However, as not stable under heat, phosphate compounds are against the requirement for recycling resin products containing them. This is still another problem with phosphate compounds.

Apart from the above, known is another technique of adding silicone compounds to polycarbonate resins to make the resins have flame retardancy. In this, silicone compounds do not give toxic gas when fired. For example, (1) Japanese Patent Laid-Open No. 139964/1998 discloses a flame retardant that comprises a silicone resin having a specific structure and a specific molecular weight.

(2) Japanese Patent Laid-Open Nos. 45160/1976, 318069/1989, 306265/1994, 12868/1996, 295796/1996, and Japanese Patent Publication No. 48947/1991 disclose silicone-containing flame-retardant polycarbonate resins. However, the level of the flame retardant disclosed in (1) is high in some degree, but the impact resistance of resin moldings containing it is often low. The technology of (2) differs from that of (1) in that the silicones used in (2) do not act as a flame retardant by themselves, but are for improving the dropping resistance of resins, and some examples of silicones for that purpose are mentioned. Anyhow, in (2), the resins indispensably require an additional flame retardant of, for example, phosphate compounds or salts of Group 2 metals. Another problem with the resins described in (2) is that the flame retardant added thereto worsens the moldability of the resins and the physical properties of the resin moldings.

Also known is a flame-retardant polycarbonate resin composition that comprises a polycarbonate-polyorganosiloxane copolymer-containing resin (this is one type of polycarbonate resin) and contains a fibril-forming polytetrafluoroethylene (Japanese Patent Laid-Open No. 81620/1996). Even though its polyorganosiloxane content is low, falling within a defined range, the composition exhibits good flame retardancy. Japanese Patent Laid-Open No. 176425/1996 discloses a method of using an organic alkali metal or alkaline earth metal salt and a polyorganosiloxane for improving the flame retardancy of polycarbonate resins without detracting from the transparency thereof. In the two known techniques, however, the flame retardancy of the resin compositions could be improved, but the impact resistance thereof is often lowered.

Japanese Patent Publication No. 70176/1994 discloses a method of using a core/shell type elastomer as one component of polycarbonate resin compositions, in which the elastomer is for improving the flame retardancy of the resin compositions not detracting from the impact resistance thereof. However, this is still problematic in the thermal stability of the resin compositions. When the resin compositions are molded into large-sized moldings, they are often yellowed or silvered and therefore their appearance is not good.

The present invention has been made in the current situation as above, and its object is to provide a non-halogen (other than fluorine), flame-retardant polycarbonate resin composition of which the flame retardancy is good and which has good moldability, good impact resistance, good thermal stability, good wet heat resistance and good recyclability.

DISCLOSURE OF THE INVENTION

We, the present inventors have assiduously studied, and, as a result, have found that, when a specific rubber elastomer, an organic alkali metal salt or alkaline earth metal salt, and a specific polyfluoro-olefin resin are added to a polycarbonate resin, then the above-mentioned object of the invention can be effectively attained. On the basis of this finding, we have completed the invention.

Specifically, the invention is summarized as follows:

1. A flame-retardant polycarbonate resin composition comprising (A) 100 parts by weight of a polycarbonate resin, (B) from 0.2 to 10 parts by weight of a core/shell type, grafted rubbery elastomer, (C) from 0.02 to 5 parts by weight of an organic alkali metal salt and/or an organic alkaline earth metal salt, and (D) from 0.02 to 3 parts by weight of a polyfluoro-olefin resin.

2. The flame-retardant polycarbonate resin composition of above 1, which further contains (E) from 0.1 to 10 parts by weight, relative to 100 parts by weight of the polycarbonate resin (A), of a functional group-having silicone compound.

3. The flame-retardant polycarbonate resin composition of above 1 or 2, wherein the core/shell type, grafted rubbery elastomer of the component (B) is grafted with an acrylic polymer.

4. The flame-retardant polycarbonate resin composition of any of above 1 to 3, wherein the rubbery polymer content of the core/shell type, grafted rubbery elastomer of the component (B) is at least 40% by weight.

5. The flame-retardant polycarbonate resin composition of any of above 2 to 4, wherein the functional group-having silicone compound of the component (E) is an organopolysiloxane having a basic structure of a general formula (1):

$$R^1_a R^2_b SiO_{(4-a-b)/2} \qquad (1)$$

wherein $R^1$ indicates a functional group, $R^2$ indicates a hydrocarbon residue having from 1 to 12 carbon atoms, and a and b are numbers satisfying the relations of $0 < a \leq 3$, $0 \leq b < 3$, and $0 < a+b \leq 3$.

6. The flame-retardant polycarbonate resin composition of any of above 1 to 5, wherein the polyfluoro-olefin resin of the component (D) is a polytetrafluoroethylene having the ability to form fibrils and having a mean molecular weight at least 500,000.

7. The flame-retardant polycarbonate resin composition of any of above 1 to 6, wherein the polycarbonate resin of the component (A) has a viscosity-average molecular weight of from 15,000 to 25,000.

8. The flame-retardant polycarbonate resin composition of any of above 1 to 7, which satisfies the standard of UL94/5VA (2.5 mm) or UL94/5VB (2.5 mm).

9. Housings or parts of electric and electronic appliances, which comprises the flame-retardant polycarbonate resin composition of any of above 1 to 8.

BEST MODES OF CARRYING OUT THE INVENTION

The invention is described in detail hereinunder.
(A) Polycarbonate Resin

The polycarbonate resin (PC) for the component (A) in the flame-retardant polycarbonate resin composition of the invention is not specifically defined, and may be any and every one known in the art. Generally used herein are aromatic polycarbonates to be produced from diphenols and carbonate precursors. For example, herein used are polycarbonates produced by reacting a diphenol and a carbonate precursor in a solution method or in a melt method, such as those produced through reaction of a diphenol and phosgene or through interesterification of a diphenol and a diphenyl carbonate.

Various diphenols are usable, typically including 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ether, and bis(4-hydroxyphenyl)ketone.

For the diphenols for use herein, especially preferred are bis(hydroxyphenyl)alkanes, more preferably, those consisting essentially of bisphenol A. The carbonate precursors for use in the invention include, for example, carbonyl halides, carbonyl esters, and haloformates, concretely, phosgene, diphenol dihaloformates, diphenyl carbonate, dimethyl carbonate, and diethyl carbonate. Other diphenols such as hydroquinone, resorcinol, and catechol are also usable in the invention. The diphenols mentioned herein may be used either singly or as combined.

The polycarbonate resin may have a branched structure, for which the branching agent includes, for example, 1,1,1-tris(4-hydroxyphenyl)ethane, α,α',α"-tris(4-hydroxyphenyl)-1,3,5-triisopropylbenzene, phloroglucine, trimellitic acid, and isatin-bis (o-cresol). For controlling the molecular weight of the polycarbonate resin, for example, employable are phenol, p-t-butylphenol, p-t-octylphenol, and p-cumylphenol.

The polycarbonate resin for use in the invention may be a copolymer such as a polyester-polycarbonate resin to be produced through polymerization of a polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention.

The viscosity-average molecular weight of the polycarbonate resin to be used in the invention preferably falls between 15,000 and 25,000, more preferably between 15,000 and 20,000. Polycarbonate resins having a viscosity-average molecular weight of smaller than 15,000 are unfavorable as the physical properties of the resin composition are often poor; and those having a viscosity-average molecular weight of larger than 25,000 are also unfavorable as their flowability is poor and the moldability of the resin composition is often not good. The viscosity of the resin in a methylene chloride solution at 20° C. is measured with an Ubbelohde's viscometer, and the intrinsic viscosity [η] thereof is derived from it. The viscosity-average molecular weight (Mv) of the resin is calculated according to the following equation:

$$[\eta] = 1.23 \times 10^{-5} \, Mv^{0.83}.$$

(B) Core/shell Type, Grafted Rubbery Elastomer

For the component (B) of the resin composition of the invention, the core/shell type, grafted rubbery elastomer has a two-layered structure composed of a core and a shell, in which the core is of a flexible rubber material and the shell that covers the core is of a hard resin material. As a whole, the elastomer itself is powdery or granular. After blended with a polycarbonate resin in melt, the core/shell type, grafted rubbery elastomer of that type mostly keeps its original powdery or granular condition. Since the grafted rubbery elastomer mostly keeps its original powdery or granular condition after having been blended with the resin melt, it uniformly disperses in the resin composition and is effective for preventing the moldings of the resin composition from being troubled by surface layer peeling.

Known are various core/shell-type, grafted rubbery elastomers that are usable herein. Commercially-available products of such elastomers include, for example, Hiblen B621 (from Nippon Zeon), KM-330 (from Rohm & Haas), Metablen W529, Metablen S2001, Metablen C223, Metablen B621 (all from Mitsubishi Rayon).

Above all, for example, preferred are those to be produced through polymerization of one or more vinylic monomers in the presence of a rubbery polymer obtained from monomers of essentially alkyl acrylates or alkyl methacrylates. In the alkyl acrylates and acryl methacrylates, the alkyl group preferably has from 2 to 10 carbon atoms. Concretely, the acrylates and methacrylates include, for example, ethyl acrylate, butyl acrylate, 2-ethylhexyl acrylate, and n-octyl methacrylate. One example of the rubbery polymers that are obtained from monomers of essentially those alkyl acrylates is a polymer to be prepared through reaction of at least 70% by weight of an alkyl acrylate with at most 30% by weight of any other copolymerizable vinylic monomer such as methyl methacrylate, acrylonitrile, vinyl acetate, styrene, etc. To prepare the polymer, a polyfunctional monomer serving as a crosslinking agent, such as divinylbenzene, ethylene dimethacrylate, triallyl cyanurate, or triallyl isocyanurate, may be added to the polymerization system.

For use herein, the rubbery polymer may be combined with a polysiloxane rubber.

The vinylic monomers to be polymerized in the presence of such a rubbery polymer include, for example, aromatic vinyl compounds such as styrene, α-methylstyrene; alkyl acrylates such as methyl acrylate, ethyl acrylate; and alkyl methacrylates such as methyl methacrylate, ethyl methacrylate. One or more these monomers may be (co)polymerized, as combined, or may be copolymerized with any other vinylic monomers such as vinyl cyanide compounds (e.g., acrylonitrile, methacrylonitrile), and vinyl esters (e.g., vinyl acetate, vinyl propionate) . The (co)polymerization may be effected in any known method of, for example, bulk polymerization, suspension polymerization, or emulsion polymerization. Especially preferred is emulsion polymerization.

It is desirable that the core/shell-type, grafted rubbery elastomers thus produced in the manner mentioned above contain at least 20% by weight of the rubbery polymer moiety, more preferably at least 40% by weight thereof. Typical examples of the core/shell-type, grafted rubbery elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with at least one vinylic monomer, in which the composite rubber comprises from 5 to 95% by weight of a polysiloxane rubber component and from 5 to 95% by weight of a polyacryl (meth)acrylate rubber component as so entangled that they are not separated from each other, and has a mean particle size of from 0.01 to 1 μm or so. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen S-2001 from Mitsubishi Rayon.

The content of the component (B), core/shell type, grafted rubbery elastomer in the resin composition falls between 0.2 and 10 parts by weight, preferably between 0.5 and 5 parts by weight, relative to 100 parts by weight of the polycarbonate resin (A) therein. If the grafted rubbery elastomer content of the resin composition is too small, the impact resistance of the resin composition will be low; but if too large, the flame retardancy, the thermal stability and the wet heat resistance of the resin composition will be low. If any other graft copolymer than the core/shell type, grafted rubbery elastomer is therein, the resin composition could have good impact strength but it could not realize the level of flame retardancy which the present inventors have intended to attain in the invention.

(C) Organic Alkali Metal Salt and/or Organic Alkaline Earth Metal Salt

The resin composition of the invention contains an organic alkali metal salt and/or alkaline earth metal salt for the component (C) . Various types of organic alkali metal salts and alkaline earth metal salts are known, and those of organic acids or their esters having at least one carbon atom are usable herein. The organic acids and their esters are organic sulfonic acids and carboxylic acids and their esters. The alkali metals are sodium, potassium, lithium, cesium, etc.; and the alkaline earth metals are magnesium, calcium, strontium, barium, etc. Above all, preferred for use herein are salts with sodium, potassium or cesium. The salts of organic acids may be substituted with halogen such as fluorine, chlorine or bromine.

For the organic alkali metal salts and alkaline earth metal salts of, for example, organic sulfonic acids, preferred for use herein are alkali metal or alkaline earth metal perfluoroalkanesulfonates of the following general formula (I):

$$(C_nF_{2n+1}SO_3)_mM \tag{I}$$

wherein n in an integer of from 1 to 10; M indicates an alkali metal salt such as lithium, sodium, potassium or cesium, or an alkaline earth metal salt such as magnesium, calcium, strontium or barium; and m indicates the atomic valence of M. Examples of the compounds are described, for example, in Japanese Patent Publication No. 40445/1972.

In formula (I), the perfluoroalkanesulfonic acid includes, for example, perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, perfluoro-octanesulfonic acid. Especially preferred for use herein are potassium salts of these acids. In addition, also usable herein are alkali metal salts and alkaline earth metal salts of organic sulfonic acids such as 2,5-dichlorobenzenesulfonic acid, 2,4,5-trichlorobenzenesulfonic acid, diphenylsulfone-3-sulfonic acid, diphenylsulfone-3,3'-disulfonic acid, naphthalenetrisulfonic acid.

The organic carboxylic acids capable of forming the salts include, for example, perfluoroformic acid, perfluoromethanecarboxylic acid, perfluoroethanecarboxylic acid, perfluoropropanecarboxylic acid, perfluorobutanecarboxylic acid, perfluoromethylbutanecarboxylic acid, perfluorohexanecarboxylic acid, perfluoroheptanecarboxylic acid, perfluoro-octanecarboxylic acid. Alkali metal salts and alkaline earth metal salts of these organic carboxylic acids are usable herein, for which the alkali metals and alkaline earth metals may be the same as those mentioned hereinabove.

One or more salts may be used either singly or as combined for the component (C). The salt content of the resin composition may fall between 0.02 and 5 parts by weight, preferably between 0.05 and 3 parts by weight, relative to 100 parts by weight of the component (A). If the salt content is too small, the resin composition could hardly realize the intended flame retardancy; but even if increased over the defined range, it enhances no more the flame retardancy of the resin composition and is rather uneconomical.

(D) Polyfluoro-olefin Resin

In the resin composition of the invention, the component (D), polyfluoro-olefin resin is for preventing the resin moldings from being melted to drop down when fired. This is tested, for example, in a flame retardancy test. The polyfluoro-olefin resin is generally a polymer or copolymer having a fluoroethylene structure. For example, it includes difluoroethylene polymers, tetrafluoroethylene polymers, tetrafluoroethylene-hexafluoropropylene copolymers, and copolymers of tetrafluoroethylene and fluorine-free ethylenic monomers. Preferred for use herein is polytetrafluoroethylene (PTFE), and its mean molecular weight is preferably at least 500,000, more preferably from 500,000 to 10,000,000. Any and every type of polytetrafluoroethylene known in the art is usable in the invention.

Especially preferred for use herein is polytetrafluoroethylene having the ability to form fibrils, as it is more effective for preventing the resin melt from dropping. The fibril-forming polytetrafluoroethylene (PTFE) usable herein is not specifically defined. For example, PTFE of Type 3 that is grouped according to the ASTM Standard is used herein. Commercial products of such PTFE are available, including, for example, Teflon 6-J (from Mitsui-DuPont Fluorochemical), Polyflon D-1, Polyflon F-103 and Polyflon F201 (all from Daikin Industry), and CD076 (from Asahi ICI Fluoropolymers).

Except PTFE of Type 3 as above, others are also usable herein, including, for example, Argoflon 5 (from Montefluos), Polyflon MPA, Polyflon FA-100 (both from Daikin Industry), etc. One or more of these polytetrafluoroethylenes (PTFE) can be used either singly or as combined. The fibril-forming polytetrafluoroethylene (PTFE) such as those mentioned above can be obtained, for example, by polymerizing tetrafluoroethylene in an aqueous medium in the presence of sodium, potassium or ammonium peroxydisulfide therein, under a pressure of from 1 to 100 psi at a temperature falling between 0 and 200° C., preferably between 20 and 100° C.

The content of the component (D) in the resin composition falls between 0.02 and 3 parts by weight, preferably between 0.05 and 1 part by weight, relative to 100 parts by weight of the component (A) therein. If it is too small, the resin melt-dropping preventing ability of the composition will be not enough for the intended flame retardancy of the composition. However, even if the content is larger than the defined range, the effect of the polyfluoro-olefin resin added could not be augmented any more, and such a large amount of the polyfluoro-olefin resin, if added to the composition, will have some negative influences on the impact resistance and the outward appearance of the moldings of the composition. Therefore, the amount of the polyfluoro-olefin resin to be added to the composition may be suitably determined, depending on the necessary flame retardancy of the composition, for example, based on V-0, V-1 or V-2 in UL-94, and depending on the amount of the other constituent components.

(E) Functional Group-having Silicone Compound

When comprising the above-mentioned four components, the resin composition of the invention can attain the intended object. In order to further augment its flame retardancy, the composition may additionally contain a functional group-having silicone compound for the component (E). The functional group-having silicone compound is preferably a functional group-having (poly)organosiloxane, of which the skeleton is a polymer or copolymer having a basic structure of a formula, $R^1{}_a R^2{}_b SiO_{(4-a-b)/2}$ (wherein $R^1$ indicates a functional group, $R^2$ indicates a hydrocarbon residue having from 1 to 12 carbon atoms, and $0<a\leq3$, $0\leq b<3$, and $0<a+b\leq3$). The functional group includes, for example, an alkoxy group, an aryloxy group, a polyoxyalkylene group, a hydride residue, a hydroxyl group, a carboxyl group, a silanol group, an amino group, a mercapto group, an epoxy group, and a vinyl group. Of those, preferred are a hydride group, a hydroxyl group, an alkoxy group, an epoxy group, and a vinyl group.

The silicone compound for use here in may have a plurality of different functional groups; or a plurality of silicone compounds having different functional groups may be combined for use herein. In the functional group-having silicone compound, the ratio of functional group ($R^1$)/hydrocarbon residue ($R^2$) generally falls between 0.1 and 3 or so, but preferably between 0.3 and 2 or so.

The silicone compound is liquid or powdery, but is preferably well dispersible in the other constituent components while they are kneaded in melt. For example, the silicone compound may be liquid at room temperature, having a viscosity at room temperature of from 1,000 to 500,000 cst or so. The polycarbonate resin composition of the invention is characterized in that the silicone compound uniformly disperses therein even when it is liquid, and that the compound bleeds little out of the composition being molded and out of the moldings of the composition.

The resin composition may contain from 0.1 to 10 parts by weight, preferably from 0.2 to 5 parts by weight of the functional group-having silicone compound, relative to 100 parts by weight of the component (A) therein. If the content of the compound is too small in the composition, the compound will be ineffective; but even if too much, the compound could no more augment its effect.

The flame-retardant polycarbonate resin composition of the invention may contain, if desired, an inorganic filler which is for enhancing the stiffness of the resin moldings and for further enhancing the flame retardancy thereof. The inorganic filler includes, for example, talc, mica, kaolin, diatomaceous earth, calcium carbonate, calcium sulfate, barium sulfate, glass fibers, carbon fibers, and potassium titanate fibers. Especially preferred for use herein are tabular fillers of, for example, talc and mica, and fibrous fillers. Talc is a magnesium silicate hydrate, and this is available on the market. The inorganic filler such as talc for use herein may have a mean particle size of from 0.1 to 50 μm, but preferably from 0.2 to 20 μm. The inorganic filler, especially talc in the resin composition is effective for further enhancing the stiffness of the moldings of the composition, and, as the case may be, it will be able to reduce the amount of the silicone compound to be in the composition.

The inorganic filler content of the resin composition may fall between 1 and 100 parts by weight, preferably between 2 and 50 parts by weight, relative to 100 parts by weight of the component (A), polycarbonate resin in the composition. If its amount is too small, the inorganic filler added could not satisfactorily exhibit its effect of enhancing the stiffness and the flame retardancy of the moldings of the composition; but if too large, the impact resistance of the moldings will lower and the melt fluidity of the composition will lower. The amount of the inorganic filler to be in the composition may be suitably determined, depending on the necessary properties of the moldings and the moldability of the composition, especially on the thickness of the moldings and the spiral flow length of the composition.

The flame-retardant polycarbonate resin composition of the invention may contain, in addition to the essential components (A), (B), (C) and (D), at least one optional component such as the component (E) and even any other additives which are generally added to ordinary thermoplastic resins, if desired. The additives are for further improving the moldability of the composition and for further improving the impact resistance, the outward appearances, the weather resistance and the stiffness of the moldings of the composition. They include, for example, phenolic, phosphorus-containing or sulfur-containing antioxidants, antistatic agents, polyamide-polyether block copolymers (for permanent static electrification resistance), benzotriazole-type or benzophenone-type UV absorbents, hindered amine-type light stabilizers (weather-proofing agents), plasticizers, microbicides, compatibilizers, and colorants (dyes, pigments) For their amount, the optional additives that may be in the flame-retardant polycarbonate resin composition of the invention are not specifically defined, provided that they do not interfere with the properties of the composition.

A method for producing the flame-retardant polycarbonate resin composition of the invention is described. The composition may be produced by mixing and kneading the components (A), (B), (C) and (D) in the predetermined ratio as above, optionally along with the optional component such as (E) and additives as above in any desired ratio. Formulating and mixing the constituent components into the intended resin composition may be effected in any known manner, for example, by pre-mixing them in an ordinary device, such as a ribbon blender or a drum tumbler, followed by further kneading the resulting pre-mix in a Henschel mixer, a Banbury mixer, a single-screw extruder, a double-screw extruder, a multi-screw extruder, or a cokneader. The temperature at which the components are mixed and kneaded generally falls between 240 and 300° C. For molding the melt mixture, preferably used is an extrusion molding machine, more preferably a vented extruder. Other constituent components than polycarbonate resin may be previously mixed with polycarbonate resin or with any other thermoplastic resin to prepare a master batch, and it may be added to the other constituent components.

Having been prepared in the manner noted above, the flame-retardant polycarbonate resin composition of the invention may be molded into various moldings in the melt-molding devices as above, or, after it is pelletized, the resulting pellets may be molded into various moldings through injection molding, injection compression molding, extrusion molding, blow molding, pressing, vacuum forming or foaming. Especially preferably, the composition is pelletized in the melt-kneading manner as above, and the resulting pellets are molded into moldings through injection molding or injection compression molding. For injection molding of the composition, preferred is a gas-assisted molding method so as to prevent sinking marks in the moldings and to reduce the weight of the moldings.

The flame-retardant polycarbonate resin composition of the invention satisfies the standard of UL94/5VA (2.5 mm) or UL94/5VB (2.5 mm), and its moldings are usable for various housings and parts of electric and electronic appliances, such as duplicators, facsimiles, televisions, radios, tape recorders, video decks, personal computers, printers, telephones, information terminals, refrigerators, and microwave ovens. The moldings have still other applications, and are usable, for example, as automobile parts.

The invention is described more concretely with reference to the following Examples and Comparative Examples, which, however, are not intended to restrict the scope of the invention.

Examples 1 to 4, and Comparative Examples 1 to 8

The components shown in Table 1 were blended in the ratio indicated therein (in terms of parts by weight relative to 100 parts by weight of the total of the (A)), fed into a vented double-screw extruder (TEM35 from Toshiba Kikai), melted and kneaded therein at 280° C., and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. The resulting pellets were dried at 120° C. for 12 hours, and then molded into test pieces in a mode of injection molding at 270° C. The mold temperature was 80° C. These test pieces were tested for their properties in various test methods, and their data obtained are given in Table 1.

The materials used for producing the test samples, and the methods for testing the samples are mentioned below.
(A) Polycarbonate Resin
  PC-1: Toughlon A1700 (from Idemitsu Petrochemical).
  This is a bisphenol A polycarbonate resin having an MI of 27 g/10 min (at 300° C., under a load of 1.2 kg), and a viscosity-average molecular weight of 17,500.
  PC-2: Toughlon A2200 (from Idemitsu Petrochemical).
  This is a bisphenol A polycarbonate resin having an MI of 12 g/10 min (at 300° C., under a load of 1.2 kg), and a viscosity-average molecular weight of 21,500.
(B) Core/shell-type, Grafted Rubbery Elastomer
  Rubbery elastomer-1: Metablen S2001 (from Mitsubishi Rayon).
  This is a composite rubbery graft copolymer having a polydimethylsiloxane content of at least 50% by weight.
  Rubbery elastomer-2: Metablen C223 (from Mitsubishi Rayon).
  This is an MBS-type graft copolymer having a polydimethylsiloxane content of at least 60% by weight.
  Rubbery elastomer-3: Vector 8550-5 (from Dexco Polymers).
  This is an SBS-type graft copolymer (for comparison).
(C) Organic Alkali Metal, etc.
  Metal-1: Potassium diphenyl sulfonate (from UCB).
  Metal-2: Megafac F114 (from Dainippon Ink Chemical Industry).
  This is potassium perfluorobutanesulfonate.
(D) Polyfluoro-olefin Resin
  PTFE: CD076 (from Asahi ICI Fluoropolymers, having a mean molecular weight of 3,000,000).
(E) Silicone Compound
  Silicone-1: KR219 (from Shin-etsu Chemical Industry).
  This is methylphenylsilicone with vinyl and methoxy groups, having a viscosity of 18 cst.
  Silicone-2: KC-89 (from Shin-etsu Chemical Industry).
  This is methoxy group-having dimethylsilicone, having a viscosity of 20 cst.
  Flame retardant:
  Phosphate: PFR (from Asahi Denka).
  This is resorcinol bis(diphenyl phosphate).
  TBA oligomer: FG7500 (from Teijin Chemical).
  This is tetrabromobisphenol A oligomer.

Test Methods (1) Melt Flowability
  MI (melt index) of each sample is measured at 300° C. under a load of 1.2 kg, according to JIS K7210.
(2) IZOD Impact Strength
  Measured according to ASTM D256. The temperature is 23° C., and the thickness of samples is ⅛ inches. The data are in terms of $kJ/m^2$.
(3) Thermal Distortion Temperature Under Load
  Measured according to JIS K7207 (method A), under a bending stress of 18.5 $kg/cm^2$.

(4) Thermal Stability in Molding

An injection molding machine, Toshiba's IS-45P is used. The molding temperature is 300° C. Each sample is, after having been kept stayed in the cylinder of the injection molding machine for 10 minutes, molded into test pieces having a thickness of 3 mm (80 mm×40 mm×3 mm). The test pieces are macroscopically checked.

(5) Thermal Aging Resistance

After having been kept at 80° C. for 500 hours, samples are tested for their IZOD impact strength.

(6) Wet Heat Resistance

After having been kept at 70° C. and 90% humidity for 500 hours, samples are tested for their IZOD impact strength.

(7) Recyclability

Resin composition pellets are molded in a mode of injection molding at 300° C. into housings for portable personal computers (of A4 size). The mold temperature is 80° C. The housings are ground, and 100% recycled into test pieces molded in the same manner as previously.

1. The IZOD impact strength of the recycled test pieces is measured.
2. The color change of the recycled test pieces is measured. Concretely, the color (L, a, b) of the original test pieces and that of the recycled test pieces are measured with a calorimeter, according to JIS H7103 (test method for yellowing) From the data, obtained is the color difference, ΔE between the original test pieces and the recycled test pieces.

(8) Flame Retardancy

Tested according to the UL94 combustion test. Samples tested have a thickness of 1.5 mm or 2.5 mm.

TABLE 1

|  |  |  | Example 1 | Comp. Ex. 1 | Comp. Ex. 2 | Comp. Ex. 3 | Comp. Ex. 4 | Comp. Ex. 5 |
|---|---|---|---|---|---|---|---|---|
| Blend Ratio | (A) | PC-1 | 100 | 100 | 100 | 100 | 100 | 100 |
|  |  | PC-2 | — | — | — | — | — | — |
|  | (B) | Rubbery elastomer-1 | 3 | 3 | — | 0.1 | 12 | 3 |
|  |  | Rubbery elastomer-2 | — | — | — | — | — | — |
|  |  | Rubbery elastomer-3 | — | — | — | — | — | — |
|  | (C) | Organic metal-1 | 0.3 | — | 0.3 | 0.3 | 0.3 | 0.3 |
|  |  | Organic metal-2 | — | — | — | — | — | — |
|  | (D) | PTFE | 0.3 | 0.3 | 0.3 | 0.3 | 0.3 | — |
|  | (E) | Silicone-1 | — | — | — | — | — | — |
|  |  | Silicone-2 | — | — | — | — | — | — |
|  |  | Phosphate | — | — | — | — | — | — |
|  |  | TBA oligomer | — | — | — | — | — | — |
| (1) | Melt flowability: MI [g/10 min] |  | 28 | 28 | 28 | 28 | 35 | 28 |
| (2) | IZOD impact strength [kJ/m$^2$] |  | 65 | 65 | 8 | 8 | 70 | 65 |
| (3) | Thermal distortion temperature under load (18.5 kg/cm$^2$) |  | 126 | 126 | 130 | 129 | 117 | 126 |
| (4) | Thermal stability in molding (300° C., 10 min) |  | good | — | — | — | silver-yellowed | — |
| (5) | Thermal aging resistance (80° C., 500 hr) |  | 65 | — | — | — | — | — |
| (6) | Wet heat resistance (70° C., 90% humidity, 500 hr) |  | 60 | — | — | — | — | — |
| (7) | Recyclability |  |  |  |  |  |  |  |
|  | 1. IZOD impact strength [kJ/m$^2$] |  | 65 | — | — | — | — | — |
|  | 2. Color change (ΔE) |  | 1.2 | — | — | — | — | — |
| (8) | Flame retardancy |  |  |  |  |  |  |  |
|  | 1.5 mm thick |  | V-0 | HB | V-0 | V-2 | V-1 | V-2 |
|  | 2.5 mm thick |  | V-0, 5VB | V-2 | V-0, 5VB | V-2 | V-1 | V-2 |

|  |  |  | Example 2 | Example 3 | Comp. Ex. 6 | Example 4 | Comp. Ex. 7 | Comp. Ex. 8 |
|---|---|---|---|---|---|---|---|---|
| Blend Ratio | (A) | PC-1 | 100 | — | 100 | 100 | 100 | 100 |
|  |  | PC-2 | — | 100 | — | — | — | — |
|  | (B) | Rubbery elastomer-1 | — | — | — | 1 | 1 | 1 |
|  |  | Rubbery elastomer-2 | 5 | 5 | — | — | — | — |
|  |  | Rubbery elastomer-3 | — | — | 5 | — | — | — |
|  | (C) | Organic metal-1 | — | — | — | 0.2 | — | — |
|  |  | Organic metal-2 | 0.2 | 0.2 | 0.2 | — | — | — |
|  | (D) | PTFE | 0.3 | 0.3 | 0.3 | 0.2 | 0.2 | 0.2 |
|  | (E) | Silicone-1 | 1 | 1 | 1 | — | — | — |
|  |  | Silicone-2 | — | — | — | 0.5 | 0.5 | 0.5 |
|  |  | Phosphate | — | — | — | — | 5 | — |
|  |  | TBA oligomer | — | — | — | — | — | 5 |
| (1) | Melt flowability: MI [g/10 min] |  | 32 | 14 | 30 | 27 | 42 | 30 |
| (2) | IZOD impact strength [kJ/m$^2$] |  | 70 | 70 | 45 | 60 | 12 | 16 |

TABLE 1-continued

| | | | | | | |
|---|---|---|---|---|---|---|
| (3) Thermal distortion temperature under load (18.5 kg/cm²) | 125 | 127 | 123 | 128 | 102 | 128 |
| (4) Thermal stability in molding (300° C., 10 min) | good | — | silver | good | good | silver-yellowed |
| (5) Thermal aging resistance (80° C., 500 hr) | 65 | — | 30 | 55 | 5 | 8 |
| (6) Wet heat resistance (70° C., 90% humidity, 500 hr) | 60 | — | 30 | 55 | 3 | 10 |
| (7) Recyclability | | | | | | |
| 1. IZOD impact strength [kJ/m²] | 70 | — | 40 | 60 | 10 | 8 |
| 2. Color change (ΔE) | 1.5 | — | 4.0 | 0.8 | 0.7 | 4.4 |
| (8) Flame retardancy | | | | | | |
| 1.5 mm thick | V-0 | V-0 | V-2 | V-0 | V-0 | V-0 |
| 2.5 mm thick | V-0, 5VB | V-0, 5VB | V-2 | V-0, 5VB | V-0, 5VB | V-0 |

Table 1 proves the following:

<1> Comparative Example 1 not containing the component (C) has poor flame retardancy.

<2> Comparative Examples 2 and 3 not containing the component (B) or containing it but not enough have low impact strength.

<3> Comparative Example 4 containing the component (B) too much has poor thermal stability in molding and poor flame retardancy.

<4> Comparative Example 5 not containing the component (D) has poor flame retardancy.

<5> Comparative Example 6 containing SBS and not the rubbery elastomer has low impact strength, and its thermal stability in molding, thermal aging resistance, wet heat resistance, recyclability and flame retardancy are all poor.

<6> Comparative Example 7 containing a phosphate and not the component (C) has low impact strength, its thermal distortion temperature under load is low, and its thermal aging resistance, wet heat resistance and recyclability are all poor.

<7> Comparative Example 8 containing a TAB oligomer and not the component (C) has low impact strength, and its thermal stability in molding, thermal aging resistance, wet heat resistance, recyclability and flame retardancy are all poor.

INDUSTRIAL APPLICABILITY

The flame-retardant polycarbonate resin composition of the invention does not contain halogen, and has good flame retardancy even though it contains a small amount of additives. In addition, it has good moldability, good impact resistance, good thermal stability and good wet heat resistance. Moreover, as having good recyclability, it can be well recycled, and therefore solves environmental problems and saves natural resources. Accordingly, the resin composition is useful for housings and parts of office automation appliances, information appliances and other various electric and electronic appliances for household use and industrial use, and has still other applications for automobile parts, etc.

What is claimed is:

1. A flame-retardant composition, comprising: (A) 100 parts by weight of a polycarbonate resin, (B) from 0.2 to 10 parts by weight of a core/shell grafted rubbery elastomer, (C) from 0.02 to 5 parts by weight of an organic alkali metal salt and/or an organic alkaline earth metal salt, and (D) from 0.02 to 3 parts by weight of a polyfluoro-olefin resin; and wherein, the core of the grafted rubbery elastomer comprises a polymer prepared from alkyl acrylate or alkyl methacrylate monomers; or alkyl acrylate or alkyl methacrylate monomers, each with one or more additional monomers; or a polysiloxane rubber; and wherein, the composition does not contain a phosphate-containing flame retardant and does not contain a halogen-containing flame retardant, other than component (D).

2. The flame-retardant composition of claim 1, further containing (E), from 0.1 to 10 parts by weight, relative to 100 parts by weight of the polycarbonate resin (A), of a silicone compound.

3. The flame-retardant composition of claim 1, wherein the core of the grafted rubbery elastomer is at least 40% by weight of the grafted rubbery elastomer.

4. The flame-retardant composition of claim 2, wherein the silicone compound is an organopolysiloxane having a basic structure of a general formula (1):

$$R^1_a R^2_b SiO_{(4-a-b)/2} \quad (1)$$

wherein $R^1$ indicates a functional group selected from hydroxyl group, alkoxyl group, epoxy group, vinyl group, aryloxy group, carboxyl group, silanol group, hydride group, polyoxyalkylene group, amino group, or mercapto group; $R^2$ indicates a hydrocarbon residue having from 1 to 12 carbon atoms; and a and b are numbers satisfying the relations of $0<a\leq 3$, $0\leq b<3$, and $0<a+b\leq 3$.

5. The flame-retardant composition of claim 1, wherein the polyfluoro-olefin resin is a polytetrafluoroethylene having the ability to form fibrils and having a mean molecular weight of at least 500,000.

6. The flame-retardant composition of claim 1, wherein the polycarbonate resin has a viscosity-average molecular weight of from 15,000 to 25,000.

7. The flame-retardant composition of claim 1, which satisfies the standard of UL94/5VA (2.5 mm) or UL94/5VB (2.5 mm).

8. A housing or a part of an electric or electronic appliance, which comprises the flame-retardant composition of claim 1.

9. The flame-retardant composition of claim 1, wherein the polysiloxane rubber is in the form of a composite rubber.

10. The flame-retardant composition of claim 1, wherein the polysiloxane rubber is combined with a polyacryl(meth)acrylate rubber to form a composite rubber.

11. The flame-retardant composition of claim 9, wherein the polysiloxane rubber component comprises 5 to 95% by weight of the composite rubber.

12. The flame-retardant composition of claim 1, wherein the alkyl acrylates are selected from ethylacrylate, butylacrylate or 2-ethylhexylacrylate.

13. The flame-retardant composition of claim 1, wherein one or more vinylic monomers are polymerized in the presence of the core of the grafted rubbery elastomer.

14. The flame-retardant composition of claim 13, wherein the vinylic monomers are selected from aromatic vinyl compounds, alkyl acrylates, alkyl methacrylates, vinyl cyanide compounds or vinyl esters.

15. The flame-retardant composition of claim 13, wherein the vinylic monomers are selected from styrene, α-methyl styrene, methyl acrylate, ethyl acrylate, methyl methacrylate, ethyl methacrylate, acrylonitrile, methacrylonitrile, vinyl acetate or vinyl propionate.

16. The flame-retardant composition of claim 1, wherein the core of the grafted rubbery elastomer is grafted with an acrylic polymer.

17. The flame-retardant composition of claim 1, wherein the grafted rubbery elastomer comprises n-butylacrylate and graft copolymers of styrene and methylmethacrylate.

18. The flame-retardant composition of claim 1, further comprising a crosslinking agent.

19. The flame-retardant composition of claim 18, wherein the crosslinking agent is selected from divinylbenzene, ethylene dimethacrylate, triallyl cyanurate, or triallyl isocyanurate.

20. The flame-retardant composition of claim 1, wherein the composition comprises an organic aliphatic alkali metal salt and/or an organic aliphatic alkaline earth metal salt.

* * * * *